Patented Jan. 13, 1942

2,270,044

UNITED STATES PATENT OFFICE 2,270,044

HYDROCARBON CONVERSION AND CATALYST THEREFOR

Stewart C. Fulton and Boris Malishev, Elizabeth, N. J., assignors to Standard Oil Development Company, a corporation of Delaware No Drawing. Application April 15, 1939,
Serial No. 268,120

5 Claims. (Cl. 196—52)

This application is a continuation in part of our co-pending application Serial Number 166,336, filed September 29, 1937, entitled, "Cracking catalyst."

The present invention relates to the art of converting hydrocarbon oil in the presence of catalysts to yield products of desired properties and the said invention is fully disclosed in the following description and claims.

The object of this invention is to prepare a catalyst comprising a base-exchange material such as zeolite impregnated with an ammonium salt of an oxygenated compound of an element of the fifth group of the periodic system, such as ammonium phosphate.

As is well known, zeolitic compounds, either natural or synthetic, are hydrated alumina-silica compounds having also an exchangeable base such as sodium or calcium and find use in the form of the alkali metal salt as water-softening compounds. The formula of sodium zeolite may be represented as below:

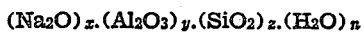

$(Na_2O)_x.(Al_2O_3)_y.(SiO_2)_z.(H_2O)_n$

According to this invention, a zeolite, such as the sodium zeolite above referred to, is treated at room temperature or above with an ammonium salt of phosphoric acid in the form of a mono, di, or triammonium phosphate. Instead of a phosphate, the ammonium salt of arsenic acid may be used. Ammonium vanadate, or the ammonium salt of any oxygenated fifth group acid-forming element may also be used. After treatment of the zeolite with the ammonium salt, the material is dried and then heated sufficiently to drive off the ammonia. It may be, although it has not been established, that the ammonium salt above referred to reacts with the zeolite, possibly with the exchangeable base portion thereof, to form a chemical compound or it may be that the ammonium salt simply impregnates the zeolite more or less superficially so that the same remains in or near the surface of the zeolite.

The catalysts made according to the present invention may be in the form of lumps, granules, grains, pills, pellets, or a powder. Where the catalyst is in the form of pills or pellets, the same may first be formed from the zeolite by an extrusion process or the like and thereafter the shaped bodies of zeolite may be treated with the ammonium salt. Conversely, the unshaped zeolite may be treated with the ammonium salt and then extruded or pressed to the desired shape.

The below example is given by way of exemplification as to the method of compounding the catalysts made according to the present invention, it being understood that the specific details therein set forth place no limitation on the invention, for numerous modifications falling within the spirit of the invention will readily occur to those skilled in this art.

Example I 4000 cubic centimeters of synthetic sodium zeolite were treated with 650 grams of ammonium phosphate in three liters of water. The treated zeolite was then washed with water. The product was dried in an atmosphere of nitrogen and then further heated in said atmosphere until a temperature of 850° F. was attained and thereafter cooled.

Example II

The catalyst prepared according to the preceding example was placed in a reaction chamber through which was passed in intimate contact with the catalyst a West Texas gas oil having a 31.2 A. P. I. gravity, at a rate of 0.6 volume of liquid gas oil per volume of catalyst per hour. The temperature of the catalyst was maintained at about from 825° F. to 850° F. The product consisted of 20.3% by volume of stable gasoline of 400° F. end point having an octane number of 80.0, an aniline end point of 50.1 and an A. P. I. gravity of 51.2.

The above process may be carried out in the presence of hydrogen.

Good results are obtained by impregnating a zeolite, either natural or synthetic, with ammonium phosphomolybdate, ammonium vanadate or ammonium arsenate to produce a catalyst which possesses an improved activity when employed in a cracking operation. The present catalysts are characterized by their adaptability to yield gasoline of high octane rating when employed in the catalytic conversion of some crackable stock.

We claim:

1. A catalyst for conversion of hydrocarbon oil comprising the product formed by first treating a base-exchange zeolite of the alumina-silica class with ammonium phosphate and thereafter heating the resulting product to liberate ammonia.

2. A method of cracking hydrocarbon oil which comprises contacting said oil in vapor form while at active cracking temperature with a catalyst formed by treating a zeolite with ammonium phosphate and then heating to liberate ammonia.

3. A catalyst adapted for converting higher boiling hydrocarbons to lower boiling hydrocarbons which comprises the product formed by first treating a zeolite with a water solution of ammonium phosphate, washing the treated zeolite, drying the treated and washed zeolite in an inert atmosphere, thereafter heating the dried zeolite to a temperature of about 850° F. and then cooling the resulting product.

4. A catalyst for conversion of hydrocarbon oil comprising the product formed by first treating a calcium zeolite compound with ammonium phosphate and thereafter heating the resulting product to liberate ammonia.

5. A method of cracking hydrocarbons which comprises contacting hydrocarbons at a cracking temperature with a catalyst formed by first treating a zeolite with a water solution of ammonium phosphate, washing the treated zeolite, drying the treated and washed zeolite in an inert atmosphere, thereafter heating the dried zeolite to a temperature of about 850° F. and then cooling the resulting product.

STEWART C. FULTON.
BORIS MALISHEV.